US011296581B2

(12) United States Patent
Yang et al.

(10) Patent No.: US 11,296,581 B2
(45) Date of Patent: Apr. 5, 2022

(54) POWER TOOL

(71) Applicant: Nanjing Chervon Industry Co., Ltd., Nanjing (CN)

(72) Inventors: Yuwei Yang, Nanjing (CN); Junya Duan, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 297 days.

(21) Appl. No.: 16/455,938

(22) Filed: Jun. 28, 2019

(65) Prior Publication Data
US 2020/0028414 A1 Jan. 23, 2020

(30) Foreign Application Priority Data

Jul. 23, 2018 (CN) .................. 201810814713.X

(51) Int. Cl.
*H01M 10/42* (2006.01)
*H02K 11/27* (2016.01)
*H02K 5/22* (2006.01)
*H02K 7/14* (2006.01)
*H02K 11/00* (2016.01)
*B23B 45/02* (2006.01)
*B24B 23/02* (2006.01)
*H02K 11/33* (2016.01)
*H01M 50/20* (2021.01)
(Continued)

(52) U.S. Cl.
CPC .............. *H02K 11/27* (2016.01); *B23B 45/02* (2013.01); *B24B 23/028* (2013.01); *H01M 50/20* (2021.01); *H02K 5/225* (2013.01); *H02K 7/145* (2013.01); *H02K 11/0094* (2013.01); *H02K 11/33* (2016.01); *H01M 50/10* (2021.01); *H01M 2220/30* (2013.01); *H02J 7/00* (2013.01); *H02P 29/02* (2013.01); *H02P 29/032* (2016.02)

(58) Field of Classification Search
CPC .. H01M 2220/30; H01M 50/10; H01M 50/20; H01M 50/543; H02J 7/00; H02K 11/0094; H02K 11/27; H02K 11/33; H02K 5/225; H02K 7/145; H02P 29/02; H02P 29/032
See application file for complete search history.

(56) References Cited

U.S. PATENT DOCUMENTS 5,461,297 A * 10/1995 Crawford ................ H02M 3/28
320/166
10,277,064 B2 * 4/2019 Geng ................ H01M 10/4207
(Continued)

*Primary Examiner* — Muhammad S Islam
(74) *Attorney, Agent, or Firm* — Greenberg Traurig, LLP

(57) ABSTRACT

A power tool that is powered by a battery pack includes a function member, a motor, a motor driving circuitry, an energy storage component, an electromagnetic switch, and a power-off protection module. The electromagnetic switch includes a coil, a first switch electrically connected to the coil and configured to turn on and off an electrical connection between the coil and the battery pack, and a second switch electrically connected to the motor driving circuitry and configured to turn on and off an electrical connection between the battery pack and the motor driving circuitry. The power-off protection module is electrically connected to the coil and to the energy storage component and is configured to cut off an electrical connection between the coil and the energy storage in response to the power tool and the battery pack being electrically disconnected.

17 Claims, 10 Drawing Sheets

(51) Int. Cl.
*H02P 29/02* (2016.01)
*H02J 7/00* (2006.01)
*H02P 29/032* (2016.01)
*H01M 50/10* (2021.01)

(56) References Cited

U.S. PATENT DOCUMENTS

2003/0214269 A1\* 11/2003 Shiue ................. H02J 7/345
 320/166
2016/0020443 A1\* 1/2016 White ................. H01M 10/425
 318/245

\* cited by examiner

POWER TOOL

RELATED APPLICATION INFORMATION

This application claims the benefit of CN 201810814713.X, filed on Jul. 23, 2018, the disclosure of which is incorporated herein by reference in its entirety.

TECHNICAL FIELD

The present disclosure relates to a power tool, and more particularly relates to a power tool which can be prevented from being immediately turned on after a power-cut.

BACKGROUND

During the operation of some power tools which use an electromagnetic switch to serve the switching function and use a battery pack as a power supply, if the battery pack is dislodged due to vibration or the like so that it is electrically disconnected from the power tool and then the battery pack is quickly inserted into the power tool again, the power tool may be started immediately when the user does not yet trigger the electromagnetic switch.

SUMMARY

In order to overcome the shortcomings of the prior art, an object of the present disclosure is to provide a power tool that can be prevented from being turned on immediately after the power tool is powered off.

In order to achieve the above-mentioned object, the present disclosure adopts the following technical solution.

There is provided a power tool that uses a battery pack as a power supply, the power tool including: a housing; a function member configured to implement a function of the power tool; a motor operatively coupled to the function member and configured to output a power to drive the function member; a motor driving circuitry electrically connected to the motor and configured to drive the motor to output the power; an energy storage component connected in parallel with the motor driving circuitry; an electromagnetic switch that includes a coil, a first switch, and a second switch, wherein the first switch is electrically connected to the coil and configured to turn on and off an electrical connection between the coil and the battery pack, the second switch is electrically connected to the motor driving circuitry and configured to turn on and off an electrical connection between the battery pack and the motor driving circuitry; and a power-off protection module that is electrically connected to the coil and to the energy storage component and that is configured to cut off an electrical connection between the coil and the energy storage component in response to the power tool and the battery pack being electrically disconnected.

Optionally, the power-off protection module includes a power-off protection terminal electrically connected to the coil and to the energy storage component.

Optionally, the power-off protection terminal includes: a first contact terminal and a second contact terminal that are arranged on the power tool and that are arranged in isolation, wherein the one of the first contact terminal and the second contact terminal is electrically connected to the coil, the other one is electrically connected to the energy storage component; and a third contact terminal configured to electrically connect the first contact terminal and the second contact terminal.

Optionally, the third contact terminal is made of a conductive material. The first contact terminal and the second contact terminal are at least partially made of a conductive material.

Optionally, the power-off protection module includes a trigger switch arranged on the power tool. The trigger switch is electrically connected to the coil and to the energy storage component, and is operative to be triggered by the battery pack, the trigger switch being configured to cut off the electrical connection between the coil and the energy storage component in response to the battery pack being removed from the power tool.

Optionally, the power-off protection module includes: an electronic switch electrically connected to the coil and to the energy storage component; a power-off detection circuit configured to detect whether the battery pack and the power tool are electrically disconnected; and a controller electrically connected to the power-off detection circuit and to the electronic switch, and configured to control the electronic switch to cut off the electrical connection between the coil and the energy storage component in accordance with a signal of the power-off detection circuit.

There is further provided a power tool that is powered by a battery pack, the power tool including: a housing; a function member, configured to implement a function of the power tool; a motor, operatively coupled to the function member and configured to output a power to drive the function member; a motor driving circuitry, electrically connected to the motor and configured to drive the motor to output the power; an energy storage component, connected in parallel with the motor driving circuitry; a main switch, including a first coil and a first switch, wherein the first switch is electrically connected to the motor driving circuitry, and is configured to turn on and off an electrical connection between the motor driving circuitry and the battery pack; a control switch, electrically connected to the first coil of the main switch and configured to control an electrical connection between the first coil of the main switch and the battery pack; and a power-off protection module, electrically connected to the energy storage component and to the first coil, and configured to cut off an electrical connection between the first coil and the energy storage component in response to the power tool and the battery pack being electrically disconnected.

Optionally, the power-off protection module includes a power-off protection terminal. The power-off protection terminal comprises a first contact terminal and a second contact terminal which are arranged on the power tool, and a third contact terminal arranged on the battery pack. The first contact terminal and the second contact terminal are arranged in isolation. One of the first contact terminal and the second contact terminal is electrically connected to the first coil, and the other one of the first contact terminal and the second contact terminal is electrically connected to the energy storage component. The third contact terminal is configured to electrically connect the first contact terminal and the second contact terminal.

Optionally, the power-off protection module includes a trigger switch arranged on the power tool. One end of the trigger switch is electrically connected to the first coil, and another end of the trigger switch is electrically connected to the energy storage component. The trigger switch is configured to cut off the electrical connection between the first coil and the energy storage component in response to the battery pack being removed from the power tool.

Optionally, the power-off protection module includes: an electronic switch, electrically connected to the first coil and to the energy storage component; a power-off detection circuit, configured to detect whether the battery pack and the power tool are electrically disconnected; and a controller, electrically connected to the power-off detection circuit and to the electronic switch, and configured to control the electronic switch to cut off the electrical connection between the first coil and the energy storage component in accordance with a signal of the power-off detection circuit.

Optionally, the control switch includes: a second coil; a second switch, electrically connected to the second coil and configured to turn on and off an electrical connection between the second coil and the battery pack; and a third switch, electrically connected to the first coil of the main switch and configured to turn on and off the electrical connection between the first coil and the battery pack.

Optionally, the first coil and the second coil are both electrically connected to the power-off protection module.

Optionally, a current-withstanding capacity of the control switch is lower than a current-withstanding capacity of the electromagnetic switch.

Optionally, the main switch is a relay switch, and the control switch is an electromagnetic switch.

There is still further provided a power tool that includes: a housing; a function member, configured to implement a function of the power tool; a battery pack, detachably mounted to the power tool, and configured to provide an electric energy for the power tool; a motor, operatively coupled to the function member and configured to output a power to drive the function member; a motor driving circuitry, electrically connected to the motor and configured to drive the motor to output the power; an energy storage component, connected in parallel with the motor driving circuitry; an electromagnetic switch, including a coil, a first switch, and a second switch, wherein the first switch is electrically connected to the coil and configured to an electrical connection between the coil and the battery pack, the second switch is electrically connected with the motor driving circuitry and configured to turn on and off an electrical connection between the battery pack and the motor driving circuitry; and a power-off protection module, electrically connected to the coil and to the energy storage component, and configured to cut off an electrical connection between the coil and the energy storage component in response to the power tool and the battery pack being electrically disconnected.

Optionally, the power-off protection module includes a power-off protection terminal electrically connected to the coil and to the energy storage component. The power-off protection terminal includes a first contact terminal and a second contact terminal which are arranged on the power tool, and a third contact terminal arranged on the battery pack. The first contact terminal and the second contact terminal are arranged in isolation. One of the first contact terminal and the second contact terminal is electrically connected to the first coil, the other one of the first contact terminal and the second contact terminal is electrically connected to the energy storage component. The third contact terminal is configured to electrically connect the first contact terminal and the second contact terminal.

Optionally, the power-off protection module includes a trigger switch arranged on the power tool. The trigger switch is electrically connected to the coil and to the energy storage component, and is operative to be triggered by the battery pack, the trigger switch being configured to cut off the electrical connection between the coil and the energy storage component in response to the battery pack being removed from the power tool.

There is still further provided a power tool that includes: a housing; a function member, configured to implement a function of the power tool; a battery pack, detachably mounted to the power tool, and configured to provide an electric power for the power tool; a motor, operatively coupled to the function member and configured to output a power to drive the function member; a motor driving circuitry, electrically connected to the motor and configured to drive the motor to output the power; an energy storage component, connected in parallel with the motor driving circuitry; a main switch, including a first coil and a first switch, wherein the first switch is electrically connected to the motor driving circuitry, and is configured to turn on and off an electrical connection between the motor driving circuitry and the battery pack; a control switch, electrically connected to the first coil of the main switch and configured to control an electrical connection between the first coil of the main switch and the battery pack; and a power-off protection module, electrically connected to the energy storage component and to the first coil, and configured to cut off an electrical connection between the first coil and the energy storage component in response to the power tool and the battery pack being electrically disconnected.

Optionally, the power-off protection module includes a power-off protection terminal electrically connected to the first coil and to the energy storage component; the power-off protection terminal includes a first contact terminal and a second contact terminal which are arranged on the power tool, and a third contact terminal arranged on the battery pack; the first contact terminal and the second contact terminal are arranged in isolation; one of the first contact terminal and the second contact terminal is electrically connected to the first coil, the other one of the first contact terminal and the second contact terminal is electrically connected to the energy storage component; the third contact terminal is configured to electrically connect the first contact terminal and the second contact terminal.

Advantages of the present disclosure are that the power tool would be inhibited from turning on immediately when the power tool is powered off due to the dislodgement of the battery pack and then the battery pack quickly inserted into the power tool again. Further, the power tool can withstand a large current and has a low cost.

BRIEF DESCRIPTION OF THE ACCOMPANYING DRAWINGS

DETAILED DESCRIPTION

Figure 1:
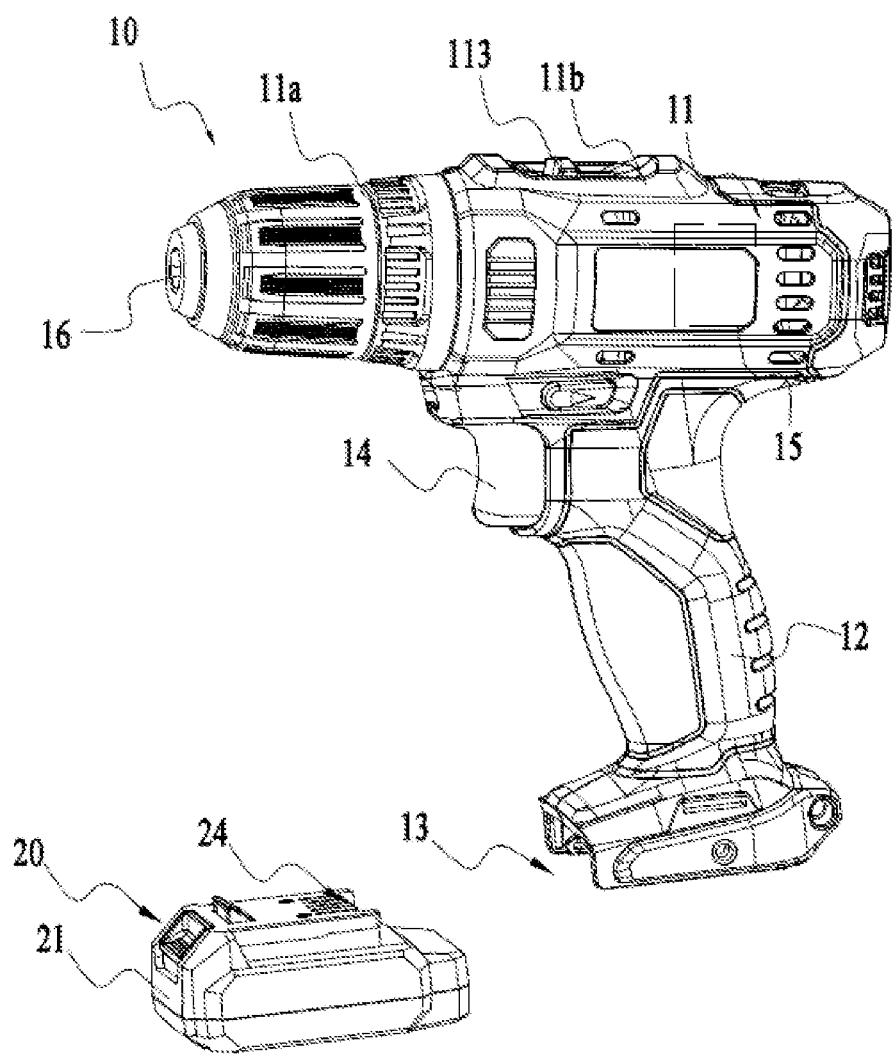
FIG. 1 is structural schematic diagram illustrating an appearance and structure of a power tool and a battery pack according to a first example of the present disclosure.

The present disclosure will now be described below in detail in connection with the accompanying drawings and some specific examples.

A power tool according to the present disclosure may be a desktop power tool, a hand-held power tool and a gardening tool, but it is not limited herein. The power tool according to the present disclosure includes, but is not limited to, the following: a cutting-type power tool such as a table saw, a reciprocating saw, a circular saw, a jig saw, and an angle grinder; a power tool that requires speed regulation such as a screwdriver and an electric drill; a power tool for impact use such as electric hammer; an gardening tool such as a pruning machine and a chain saw; and a power tool for other purposes such as a blender. As long as the power tool adopts the substantial content of the technical solution disclosed below, it shall fall in the scope of protection of the present disclosure.

The power tool includes, but is not limited to: a housing, a function member, a motor, a handle, a power supply, a circuit board, and electronic components arranged on the circuit board.

The function member is configured to implement the functions of the power tool, such as drilling, grinding and cutting. The function member is operatively connected to the motor. In particular, the function member may be connected to the motor through an output shaft. For an electric drill, the function member may be a drill bit for performing the drilling function. For a table saw, the function member may be a cutting tool or cutter. For an angle grinder, the function member may be a grinding disc.

The motor is configured to output a power to drive the function member and provide power to the function member. The motor is operatively connected to the function member. In some examples, the motor is connected to the function member through a transmission mechanism and the output shaft. The driving force of the motor can be transmitted to the transmission mechanism and the output shaft.

The handle is configured for a user to hold. The handle may be an independent part or may be formed on the housing. In some examples, the power tool may further include an operating member or an operating switch for turning on or turning off the motor. The operating member or the operating switch is disposed on the housing or the handle. When the operating member or the operating switch is triggered, the motor is turned on. When the operating member or the operating switch is released, the motor is turned off.

The power supply is configured to provide electric energy for the power tool. It is understood that the power supply may be built in the power tool or disposed external to the power tool. In this example, the power supply is the battery pack. The battery pack is detachably mounted to the power tool.

The operation of the power tool further depends on the installation of a circuit component. The circuit component includes, but is not limited to, a motor driving circuitry for driving the motor to output a power. The housing is used for accommodating the motor, the transmission mechanism, the circuit board, and the electronic components or parts. The housing at least partially accommodates the power supply.

Referring to FIG. 1, as one example, the power tool 30 is an electric drill. A battery pack 20 is used to supply power for the electric drill. The electric drill mainly includes a housing 11, a gripping portion 12, a battery pack joint portion 13, an operating mechanism 14 and a motor 15. The electric drill further includes a transmission mechanism, a drill bit, a circuit board, etc.

For an electric drill, the function member is the drill bit for implementing a drilling function. The drill bit is operatively connected to the motor 15. Specifically, the drill bit is electrically connected to the motor 15 through the output shaft and the transmission mechanism.

The housing 11 is further formed with the gripping portion 12 for the user to hold. The gripping portion 12 may also be an independent part. The housing 11 includes a head housing 11a and a body housing 11b, which constitute a main portion of the electric drill and is used for accommodating the motor, the transmission mechanism, and other electronic components such as circuit board. The head housing 11a is used for the installation of the drill bit, and includes a chuck 16 operative to clamp the drill bit. The body housing 11b is used for accommodating the motor, the transmission mechanism, the circuit board and the like which are arranged inside the housing 11. In this example, the battery pack 20 is used to supply power for the electric drill. The electric drill further includes the battery pack joint portion 13 for connecting the battery pack 40 to the electric drill.

The battery pack joint portion 13 is used to receive the battery pack 20, and may receive battery packs 20 with different voltages. A tool connection terminal 17 is arranged in the battery pack joint portion 13, and used to contact and connect to a battery pack connection terminal 23 of the battery pack 20. The tool connection terminal 17 includes a positive electrode connection terminal 17a and a negative electrode connection terminal 17b.

The electric drill further includes the operating mechanism 14 for turning on or turning off the power tool 10 or for speed regulation of the motor. The operating mechanism 14 is arranged at a position on a surface of the housing 11 where it is easy for the user to operate.

Figure 2:
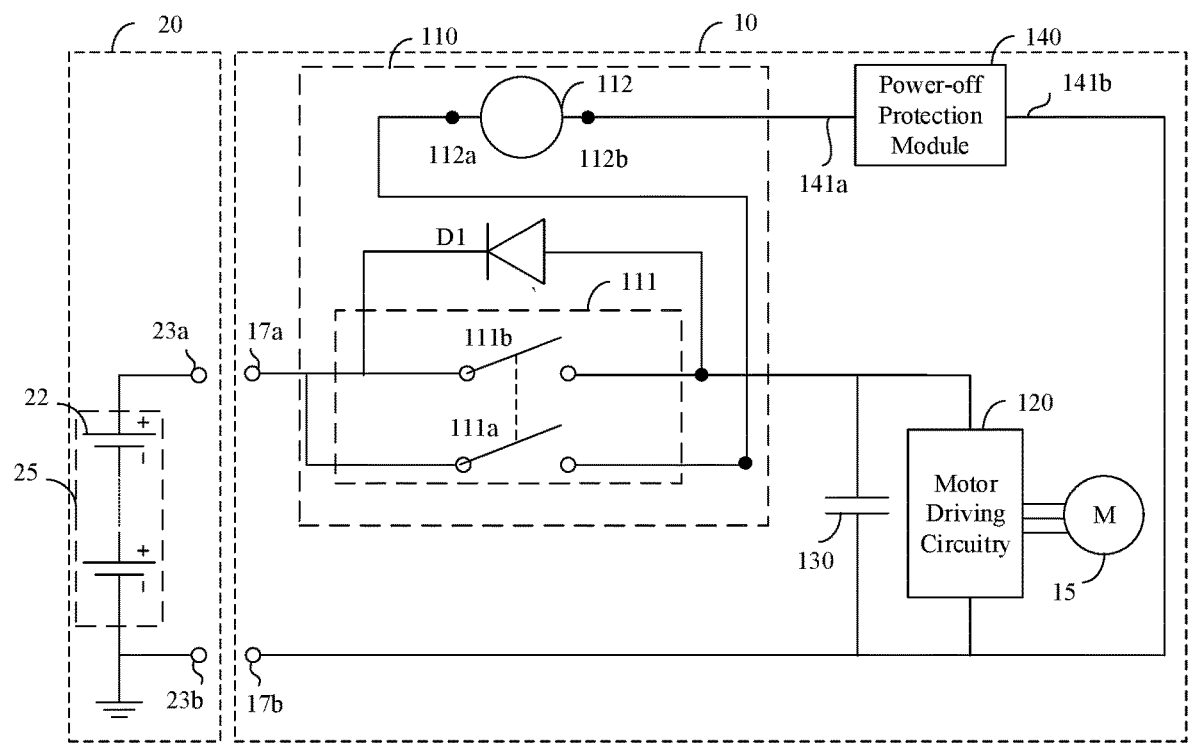
FIG. 2 is a schematic diagram of a circuit system of the power tool illustrated in in FIG. 1.

Referring to FIG. 1 and FIG. 2, the battery pack 20 includes battery cells 22 and a housing 21. The battery cells 22 are accommodated in the housing 21, and is used for store energy, and can be repeatedly charged and discharged. The housing 21 is used for accommodating the battery cells 22 and other parts. The housing 21 is formed with a connecting interface 24 for connecting the battery pack 20 to the battery pack joint portion 13 of the power tool 10. The battery pack 20 further includes the battery pack connection terminal 23 for electrically connecting to an external device. For example, the battery pack connection terminal 23 is in a contact connection with the tool connection terminal 17 of the power tool 10.

The battery cells 22 are electrically connected with each other to form a battery cell group 25. The battery pack connection terminal 23 includes a positive electrode power supply terminal 23a and a negative electrode power supply terminal 23b. The positive electrode power supply terminal 23a is electrically connected to a positive electrode of the battery cell group 25, and the negative electrode power supply terminal 23b is electrically connected to a negative electrode of the battery cell group 25. The battery pack 20 is applicable to the power tool 10, and can be used as a power source for the power tool 10. When the battery pack 20 is connected to the power tool 10, the positive electrode connection terminal 17a of the power tool 10 is in a contact connection with the positive electrode power supply terminal 23a of the battery pack 20, and the negative electrode connection terminal 17b of the power tool 10 is in a contact connection with the negative electrode power supply terminal 23b of the battery pack 20.

The operation of the power tool 10 further depends on the electronic components which are at least partially arranged on the circuit board. The circuit board is accommodated in the housing 11 of the power tool 10. The power tool 10 further includes a circuit system for driving the motor 15 to operate.

Referring to FIG. 2, as one example, the circuit system of the power tool 10 includes an electromagnetic switch 110, a motor driving circuitry 120, an energy storage component 130, and a motor 15.

The motor driving circuitry 120 is electrically connected to the motor 15 and configured for driving the motor 15 to output a power. As one example, the motor 15 is a brushless motor. The motor driving circuitry 120 is connected to the electromagnetic switch 110. The electromagnetic switch 110 is configured to connect or disconnect the electrical connection between the motor driving circuitry 120 and the battery pack 20. The motor driving circuitry 120 may be a motor driving chip, a switching circuit, etc., which are well known technologies to those having ordinary skill in the art and will not be detailed herein.

In some specific examples, one end of the motor driving circuitry 120 is electrically connected to the positive electrode connection terminal 17a of the power tool 10 through the electromagnetic switch 110, and another end of the motor driving circuitry 120 is electrically connected to the negative electrode connection terminal 17b of the power tool 10.

In order to filter and absorb a surge voltage, the motor driving circuitry 120 is connected in parallel with the energy storage component 130. In some specific examples, the energy storage component 130 is an electrolytic capacitor for filtering or absorbing the surge voltages generated by the driving circuit.

The electromagnetic switch 110 includes an operating portion 113, a switch assembly 111 associatively connected with the operation portion, a coil 112, a movable iron core wound by the coil 112, a push rod, and other structures.

The operating portion 113 is configured for the user to operate, and may be a button. The coil 112 and the movable iron core together constitute an electromagnet, which can generate a magnetic force after the coil 112 is energized. The switch assembly 111 includes a first switch 111a and a second switch 111b. The first switch 111a is electrically connected to coil 112, and is configured for turning on and off the electrical connection between the coil 112 and the battery pack 20. The second switch 111b is electrically connected to the motor driving circuitry 120, and is configured for turning on and off the electrical connection between the battery pack 20 and the motor driving circuitry 120.

The first switch 111a and the second switch 111b are associatively turned on or off. When the operating portion 113 of the electromagnetic switch 110 is triggered, the first switch 111a and the second switch 111b associated with the operating portion 113 are associatively triggered to be in an ON state. The battery pack 20 and the coil 112 are electrically connected. The coil 112 is energized, and then a magnetic force is generated to move the movable iron core. The movable iron core generates the magnetic force so that the first switch 111a and the second switch 111b are locked in the ON state. In this way, the first switch 111a and the second switch 111b remain in the ON state and the stable electrical connection between the battery pack 20 and the motor driving circuitry 120 is realized.

In particular, one end of the first switch 111a is electrically connected to the positive electrode connection terminal 17a of the power tool 10, and another end of the first switch 11a is electrically connected to the coil 112. One end of the second switch 111b is electrically connected to the positive electrode connection terminal 17a of the power tool 10, and another end of the second switch 111b is electrically connected to the motor driving circuitry 120.

The power tool 10 further includes a freewheeling diode D1. The freewheeling diode D1 is connected in parallel with the second switch 111b, and is configured for allowing the current to continue flowing after the second switch 111b is opened, thereby achieving freewheeling protection.

Referring to FIG. 2, the power tool 10 is further provided with a power-off protection module 140. The power-off protection module 140 is electrically connected to the coil 112 and to the energy storage component 110, arranged on a conductive path of the coil 112 of the electromagnetic switch 110, and is configured to cut off the electrical connection between the coil 112 and the energy storage component 130 in response to the power tool 10 and the battery pack 20 being electrically disconnected.

Specifically, a first end 141a of the power-off protection module 140 is electrically connected to the end 112b of the coil 112 of the electromagnetic switch 110. A second end 141b of the power-off protection module 140 is electrically connected to the energy storage component 130 and to the negative electrode connection terminal 17b of the power tool. The power-off protection module 140 may include software and hardware, may only involve software, or may only involve a hardware circuit.

The power-off protection module 140 of the power tool 10 of the first example illustrated in FIG. 2 only involves software. Specifically, the power-off protection module 140 includes a power-off determination logic for determining whether the power tool 10 is powered off. The power-off determination logic cooperates with a power-off detection circuit, and determines whether the power tool 10 is powered off according to an electrical signal of the external power-off detection circuit. After the power tool is determined as powered off, the power-off protection module 140 pulls up the voltage of the second end 112b of the coil 112 by means of software, so that the coil 112 would be electrically disconnected from the energy storage component. The coil 112 of the electromagnetic switch 110 would fail to obtain electrical energy from the energy storage component 130 to operate. In this way, the power tool 10 cannot be turned on immediately after the power-off is restored.

In the present example, when the power tool 10 operates normally, the power-off protection module 140 pulls down the second end 112b of the coil 112, so that the electromagnetic switch 110 operates normally and the power tool 10 operates normally. Specifically, the operation portion 113 of the electromagnetic switch 110 is triggered. The first switch 111a and the second switch 111b of the electromagnetic switch 110 are associatively trigged to be in the ON state, the coil 112 of the electromagnetic switch 110 is energized.

Since the coil 112 is energized, the moveable iron core generates a magnetic force so that the first switch 111a and the second switch 111b are locked in the ON state. A circuit between the motor driving circuitry 120 and the battery pack 20 is closed. The electric power provided by the battery pack 20 drives through the motor driving circuitry 120 the motor 15 to output a power. The motor 15 rotates and drives the drill bit to rotate. When the power tool 10 is powered off due to the dislodgement of the battery pack 20 and then the battery pack 20 is quickly inserted into the power tool again, because the power-off protection module 140 pulls up the voltage of the second end 112b of the coil 112 in the condition that the electromagnetic switch 1110 is not operated so that the electrical connection between the coil 112 and the energy storage component 130 is cut off, the coil 112 of the electromagnetic switch 110 cannot obtain electric energy from the energy storage component 130 to operate. Thus, the power tool 10 cannot be turned on immediately after the power-off is restored.

Therefore, in the present example, after the power-off protection module 140 determines that a power-off occurs, the power-off protection module 140 pulls up the voltage of the second end 112b of the coil 112 so that the electrical connection between the coil 112 and the energy storage component 130 is cut off. Accordingly, the coil 112 of the electromagnetic switch 110 cannot obtain electric energy from the energy storage component 130 to operate, whereby the switch assembly 111 of the electromagnetic switch 110 is disconnected. Namely, the first switch 111a and the second switch 111b are associatively opened, which can avoid the occurrence of a dangerous situation in which the power tool 10 is turned on immediately after the power-off is restored.

Figure 3:
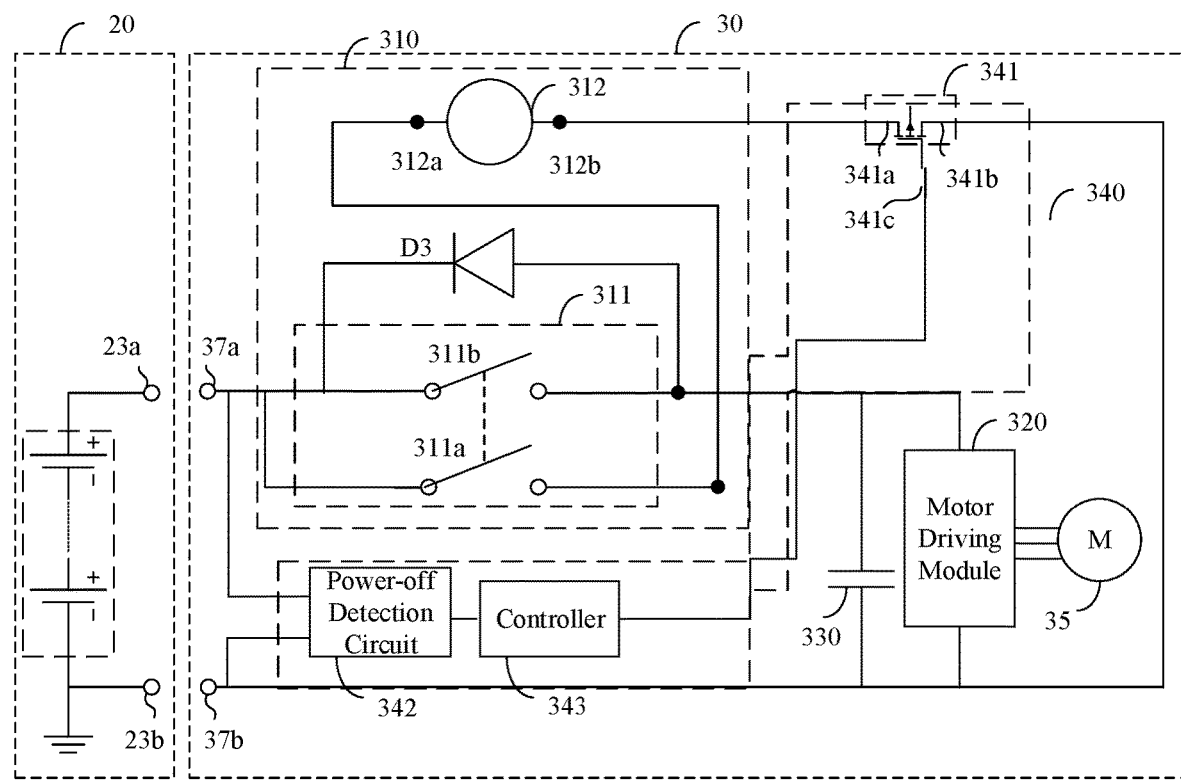
FIG. 3 is a schematic diagram of a circuit system of a power tool according to a second example of the present disclosure.

Referring to FIG. 3, a power tool 30 according to the second example comprises a positive electrode connection terminal 37a and the negative electrode connection terminal 37b which are respectively used to electrically connect to a positive electrode power source terminal 23a and a negative electrode power source terminal 23b of a battery pack 20.

Circuit system components of the power tool 30 includes an electromagnetic switch 310, a motor driving circuitry 320, an energy storage component 330, a freewheeling diode D3, a power-off protection module 340 and a motor 35. The structure, the connection relationships and the functions of the circuit system components of the power tool 30 are the same as or similar to that of the circuit system components of the power tool 10 illustrated in FIG. 2, except that the power-off protection module 340 of the power tool 30 is different from the power-off protection module 140 of the power tool 10.

In the present example, the electromagnetic switch 310 is provided with a switch assembly 311 and a coil 312. The switch assembly 311 includes a first switch 311a and a second switch 311b. The first switch 311a is electrically connected to a first end 312a of the coil 312, and is configured to turn on and off the electrical connection between the coil 312 and the battery pack 20. The second switch 311b is electrically connected to the motor driving circuitry 320, and is configured to turn on and off the electrical connection between the battery pack 20 and the motor driving circuitry 320. The first switch 311a and the second switch 311b are associatively closed and opened.

Specifically, one end of the first switch 311a is electrically connected to the positive electrode connection terminal 37a of the power tool 30m, and another end of the first switch 311a is electrically connected to the first end 312a of the coil 312. One end of the second switch 311b is electrically connected to the positive electrode connection terminal 37a of the electrical toll 30, and another end of the second switch 311b is electrically connected to the motor driving circuitry 320. The power tool 30 further includes the freewheeling diode D3. The freewheeling diode D3 is connected in parallel with the second switch 311b, and is configured for allowing the current to continue flowing after the second switch 311b is opened, thereby achieving freewheeling protection.

A first end 341a of the power-off protection module 340 is electrically connected to a second end 312b of the coil 312 of the electromagnetic switch 310. A second end 341b of the power-off protection module 340 is electrically connected to the energy storage component 130. The power-off protection module 340 is used to connect and disconnect a conductive path of the coil 312.

The structure, the connection relationships and the functions of the motor driving circuitry 320, the energy storage component 330 and the freewheeling diode D3 of the present example are the same as or similar to that of power tool 10 illustrated in FIG. 2, which therefore are not to be detailed herein again. The difference between the power tool 30 and the power tool 10 illustrated in FIG. 2 lies in that the power-off protection module 340 is different from the power-off protection module 140 of the power tool 10 illustrated in FIG. 2.

The power-off protection module 340 of the power tool 30 illustrated in FIG. 3 includes an electronic switch 341, a power-off detection circuit 342 and a controller 343.

One end 341a of the electronic switch 341 is electrically connected to one end 312 of the coil 312, and another end 341b of the electronic switch 341 is electrically connected to one end of the energy storage component 330. A control end 431c of the electronic switch 341 is electrically connected to the controller 343. The electronic switch 341 can be closed an opened according to a signal of the controller 343.

As one example, the power-off detection circuit 342 is a voltage detection circuit. The power-off detection circuit 342 is electrically connected to the positive electrode connection terminal 37a and to the negative electrode connection terminal 37b of the power tool 30, and is configured to detect a voltage difference between the positive electrode connection terminal 37a and the negative electrode connection terminal 37b of the power tool 30. An output end of the power-off detection circuit 342 is electrically connected to the controller 343.

The controller 343 determines whether the battery pack 20 is electrically disconnected from the power tool 20 based on the results detected by the power-off detection circuit 342. As one example, the controller 343 is a control chip, such as MCU. The voltage difference between the positive electrode connection terminal 37a and the negative electrode connection terminal 37b of the power tool 30 changes when the battery pack 20 and the power tool 30 are electrically disconnected, therefore the controller 343 compares the voltage value detected by the power-off detection circuit 342 with a preset threshold to determine whether the battery pack 20 and the power tool 30 are electrically disconnected. The controller 343 may also be an electronic component having a control function (such as a bipolar transistor, a field effect transistor), or a level shifting circuit.

The specific working principle of the power-off protection module 340 of the power tool 30 is as follows. When the battery pack 20 and the power tool 30 are normally connected, the electronic switch 341 is in an ON state and the power tool 30 operates normally. When the battery pack 20 and the electronic tool 30 are disconnected, the power-off detection circuit 342 of the power-off protection module 340 detects that the voltages of the positive electrode connection terminal 37a and the negative electrode connection terminal 37b of the power tool 30 are substantially equal to each other. The controller 343 outputs a control signal to control the electronic switch 341 to cut off the electrical connection between the coil 312 and the energy storage component, based on the detection results of the power-off detection circuit 342 or the signal received from the power-off detection circuit 342. Therefore, the coil 312 of the electromagnetic switch 310 cannot obtain electric energy from the energy storage component 330 to operate. The first switch 311a and the second switch 311b of the electromagnetic switch 310 are opened, thereby avoid the occurrence of a dangerous situation in which the power tool 30 is turned on immediately after the power-off is restored.

Figure 4:
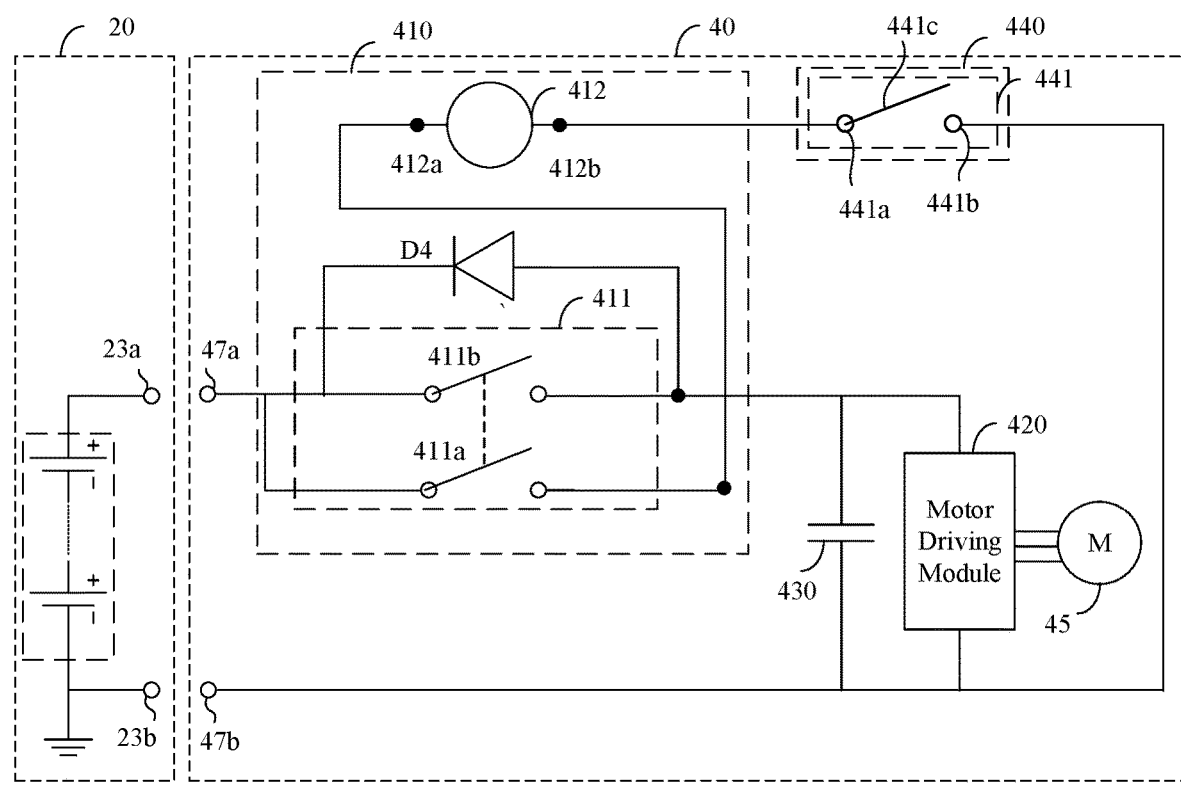
FIG. 4 is a schematic diagram of a circuit system of a power tool according to a third example of the present disclosure.
Figure 5:
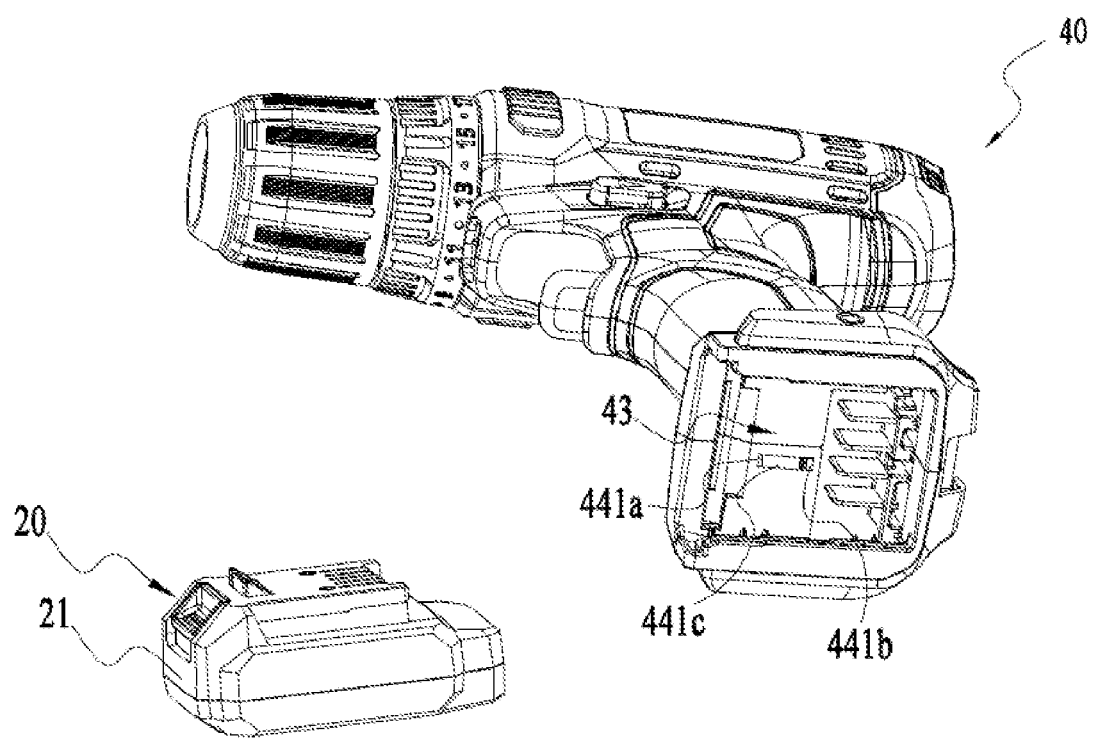
FIG. 5 is structural schematic diagram illustrating an appearance and structure of the power tool and battery pack according to the third example of the present disclosure.
Figure 6:
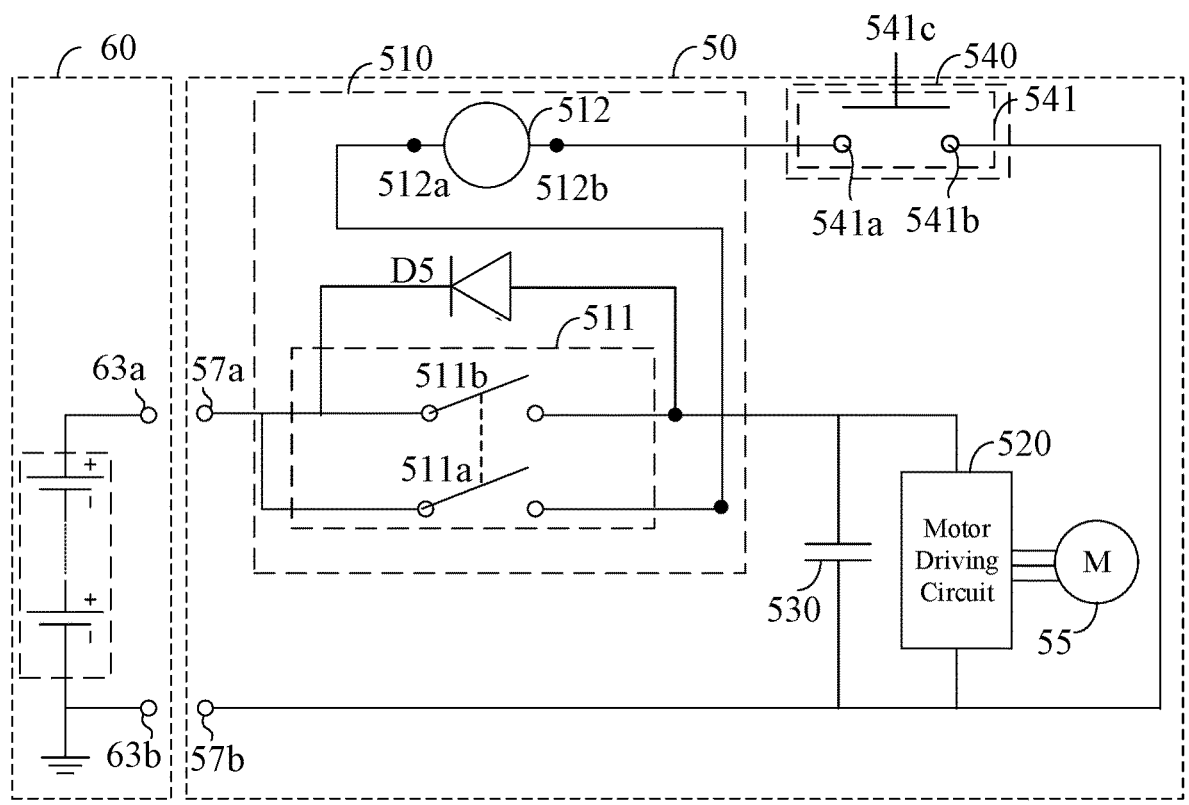
FIG. 6 is a schematic diagram of a circuit system of a power tool according to a fourth example of the present disclosure.

Referring to FIG. 4 and FIG. 5, a power tool 40 according to a third example is provided with a positive electrode connection terminal 47a and a negative electrode connection terminal 47b which are respectively used to electrically connect to a positive electrode power source terminal 23a and to a negative electrode power source terminal 23b of a battery pack 20.

Circuit system components of the power tool 40 includes an electromagnetic switch 410, a motor driving circuitry 420, an energy storage component 430, a freewheeling diode D4, a power-off protection module 440 and a motor 45. The structure, the connection relationships and the functions of the circuit system components of the power tool 40 are the same as or similar to that of circuit system components of the power tool 10 illustrated in FIG. 2 and FIG. 3, except that the power-off protection module 440 of the power tool 40 is different from the power-off protection module 140 of the power tool 10 and the power-off protection module 340 of the power tool 30.

In the present example, the electromagnetic switch 410 includes a switch assembly 411 and a coil 412. The switch assembly 411 includes a first switch 411a and a second switch 411b. The first switch 411a is electrically connected to a first end 412a of the coil 412, and is configured to turn on and off the electrical connection between the coil 412 and the battery pack 20. The second switch 411b is electrically connected to the motor driving circuitry 420, and is configured to turn on and off the electrical connection between the battery pack 40 and the motor driving circuitry 420. The first switch 411a and the second 411b are associatively closed and opened.

Specifically, one end of the first switch 411a is electrically connected to the positive electrode connection terminal 47a of the power tool 40, and another end of the first switch 411a is electrically connected to a first end 412a of the coil 412. One end of the second switch 411b is electrically connected to the positive electrode connection terminal 47a of the power tool 40, and another end of the second switch 411b is electrically connected to the motor driving circuitry 420. The power tool 40 further includes the freewheeling diode D4. The freewheeling diode D4 is connected in parallel with the second switch 411b, used to allow the current to continue flowing after the second switch 411b is opened, thereby achieving the freewheeling protection.

A first end 411a of the power-off protection module 440 is electrically connected to a second end 412b of the coil 412 of the electromagnetic switch 410. A second end 441b of the power-off protection module 440 is electrically connected to the energy storage component 430. The power-off protection module 440 is used to connect and disconnect a conductive path of the coil 412.

Referring to FIG. 4 and FIG. 5, in the present example, the power-off protection module 440 includes at least one trigger switch 441. The trigger switch 411 is arranged on one side of the power tool 40, and can be triggered by the battery pack 20. At least when the battery pack 20 is removed from or electrically disconnected from the power tool 40, the trigger switch 411 is released and in an open state. Optionally, when the battery pack 20 is mounted to the power tool 40, the trigger switch 411 is pressed by the battery pack 20 and in an ON state.

The first end 411a of the trigger switch 411 is electrically connected to the second end 412b of the coil 412 of the electromagnetic switch 410. The second end 441b of the trigger switch 441 is electrically connected to the energy storage component 430 and to the negative electrode connection terminal 47b of the power tool 40. As one specific example, the trigger switch 441 is specifically arranged at a battery pack joint portion 43 (FIG. 5). When the battery pack 20 is joined to the power tool 40, the trigger switch 411 is able to contact the battery pack 20 and be pressed by a mechanical structure or at least part of a housing 21 of the battery pack 20 to be in an ON state, so that the coil 412 of the electromagnetic switch 410 is electrically connected with the battery pack 20 and the conductive path of the coil 412 is connected. When the battery pack 20 is removed from the power tool 40, the trigger switch 441 is released, so that the coil 412 of the electromagnetic switch 410 is electrically disconnected from the battery pack 20 and the conductive path of the coil 412 is cut off.

As one specific example, the trigger switch 411 includes a first end 441a, a second end 441b and an elastic member 441c. At least a contact part between the first end 441a, the second end 441b and the elastic member 441c is made of a conductive material. The first end 441a of the trigger switch 441 is electrically connected to the second end 412b of the coil 412. The second end 441b of the trigger switch 441 is electrically connected to the energy storage component 430, and electrically connected to the negative electrode connection terminal 47b of the power tool 40. The elastic member 441c of the trigger switch 441 is operative to be pressed and released. One end of the elastic member 441c is fixed to and electrically connected to the first end 441a. When the battery pack 20 is joined to the power tool 40, the elastic member 441c is in contact with the battery pack 20, and pressed by the mechanical structure of the battery pack 20 to be in a contact connection with the second end 441b. When the battery pack 20 is removed from the power tool 40, the elastic member 441c is disconnected from the second end 441b.

In the present example, the working principle of the power-off protection module 440 of the power tool 40 is as follows. When the battery pack 20 is mounted to the power tool 40, the trigger switch 441 is triggered to be in the ON state. Then, the first switch 411a and the second switch 411b are associatively closed. The coil 412 is energized. The motor driving circuitry 420 and the battery pack 20 are firmly electrically connected. The motor driving circuitry 420 drives the motor 45 to operate. When the battery pack 20 is removed or electrically disconnected from the power tool 40, the trigger switch 441 is released. The coil 412 of the electromagnetic switch 410, the battery pack 20 and the energy storage component 430 are electrically disconnected. The electromagnetic switch 410 cannot obtain a transient power supply from the energy storage component 130, such that the switch assembly 411 of the electromagnetic switch 410 is immediately opened when the power tool 40 is transiently de-energized. When the battery pack 20 is inserted into the power tool 40 again, the electromagnetic switch 410 needs to be retriggered, such that the switch assembly 411 is closed. Then the power tool 40 is turned on, thereby achieving the purpose of power-off protection, and avoiding a danger that the power tool 40 is immediately turned on when the power tool 40 is transiently de-energized and then connected with the battery pack 20 again.

Referring to FIG. 6 to FIG. 9, a power tool 50 according to the fourth example comprises a positive electrode connection terminal 57a and a negative electrode connection terminal 57b which are configured to electrically connect to a positive electrode power source terminal 53a and a negative electrode power source terminal 63b of a battery pack 20, respectively.

Circuit system components of the power tool 50 includes an electromagnetic switch 510, a motor driving circuitry 520, an energy storage component 530, a freewheeling diode D5, a power-off protection module 540 and a motor 55. The structure, the connection relationships and the functions of the circuit system components of the power tool 50 are the same as or similar to that of the circuit system components of power tool (10, 30, 40) illustrated in FIG. 2 to FIG. 4, only the power-off protection module 540 of the power tool 50 is different from the power-off protection module (110, 310, 410) of the power tool (10, 30, 40).

In the present example, the electromagnetic switch 510 includes a switch assembly 511 and a coil 513. The switch assembly 511 includes a first switch 511a and a second switch 511b. The first switch 511a is electrically connected to a first end 512a of the coil 512, and is configured to turn on and off the electrical connection between the coil 512 and the battery pack 60. The second switch 511b is electrically connected to the motor driving circuitry 520, and is configured to turn on and off the electrical connection between the battery pack 60 and the motor driving circuitry 520. The first switch 511a and the second switch 511b are associatively closed and opened.

Specifically, one end of the first switch 511a is electrically connected to the positive electrode connection terminal 57a of the power tool 50, and another end of the first switch 511a is electrically connected to the first end 512a of the coil 512. One end of the second switch 511b is electrically connected to the positive electrode connection terminal 57a of the power tool 50, and another end of the second switch 511b is electrically connected to the motor driving circuitry 520. The power tool 50 further includes the freewheeling diode D5. The freewheeling diode D5 is connected in parallel with the second switch 511b, and is configured to allow the current to continue flowing after the second switch 511b is opened, thereby achieving the freewheeling protection.

A first end 541a of the power-off protection module 540 is electrically connected to a second end 512b of the coil 512 of the electromagnetic switch 510. A second end 541b of the power-off protection module 540 is electrically connected to the energy storage component 530.

In the present example, the power-off protection module 540 includes a power-off protection terminal 541. At least part of the power-off protection terminal 541 is electrically connected to the coil 512 and to the energy storage component 530, and is configured to connect and disconnect a conductive path of the coil 512.

In some specific example, the power-off protection terminal 541 includes a first contact terminal 541a and a second contact terminal 541b which are arranged on one side of the power tool 50. The first contact terminal 541a and the second contact terminal 541b are arranged in isolation. One of the first contact terminal 541a and the second contact terminal 541b is electrically connected to the coil 512, and the other one of the first contact terminal 541a and the second contact terminal 541b is electrically connected to the energy storage component 530. The power-off terminal 541 further includes a third contact terminal 541c arranged on a battery pack 60 side. The third contact terminal 541c is configured to connect to the first contact terminal 541a and the second contact terminal 541b, so as to electrically connect the first contact terminal 541a and the second contact terminal 541b.

Figure 7:
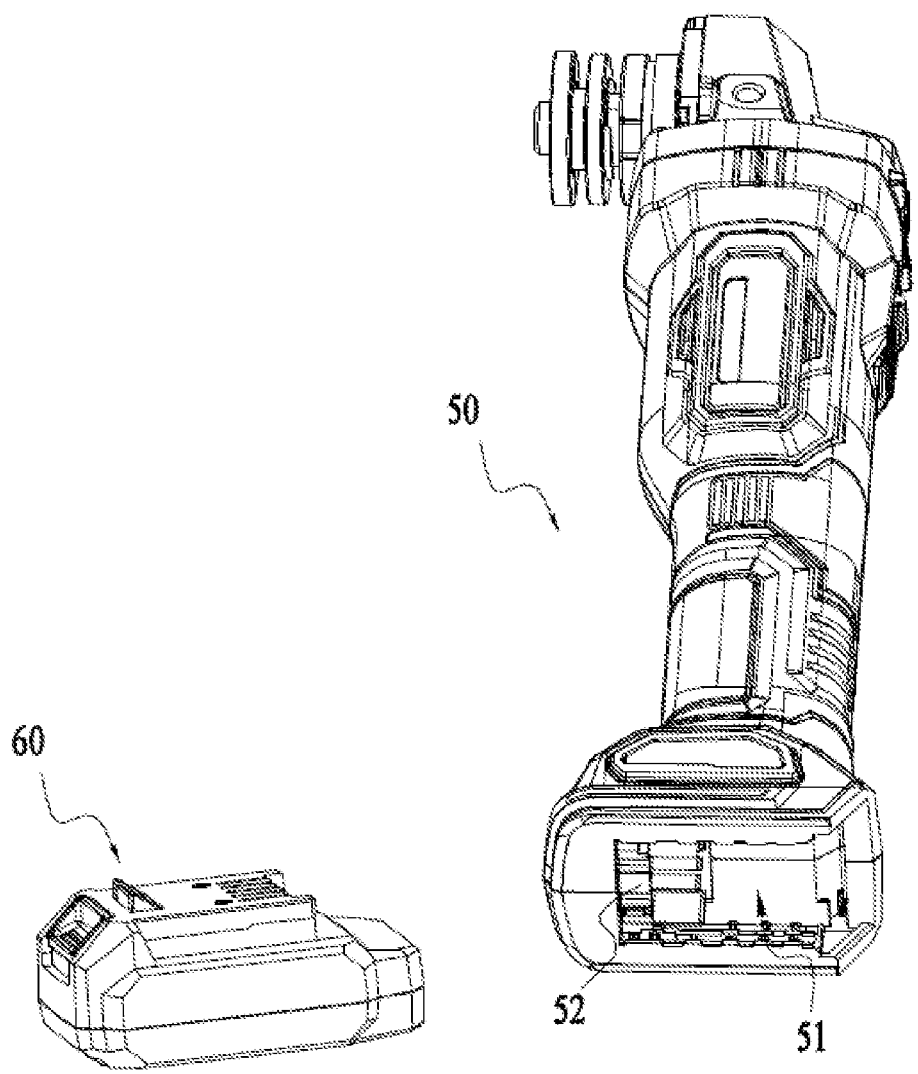
FIG. 7 is structural schematic diagram of a circuit system of the power tool and battery pack according to the fourth example of the present disclosure.
Figure 8:
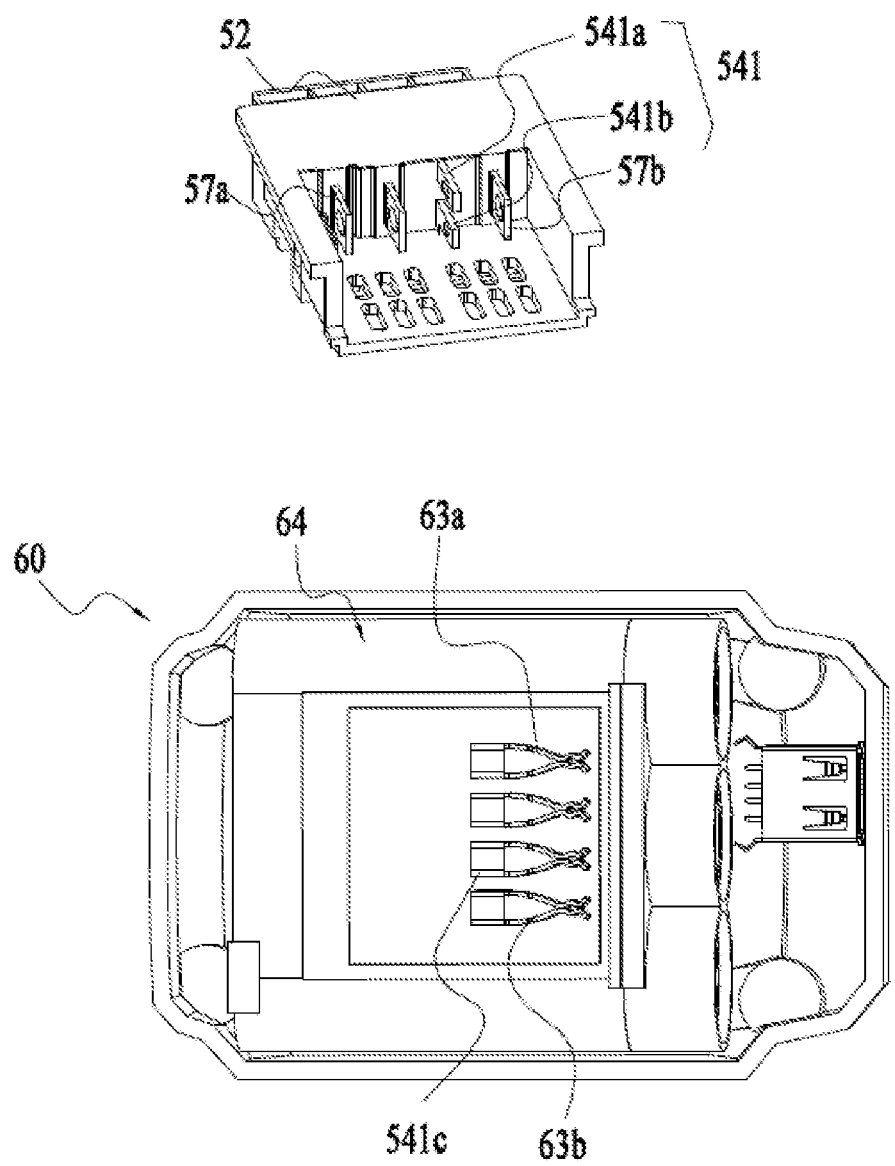
FIG. 8 is a partial schematic diagram illustrating an appearance and structure of the power tool and battery pack according to the fourth example of the present disclosure.
Figure 9:
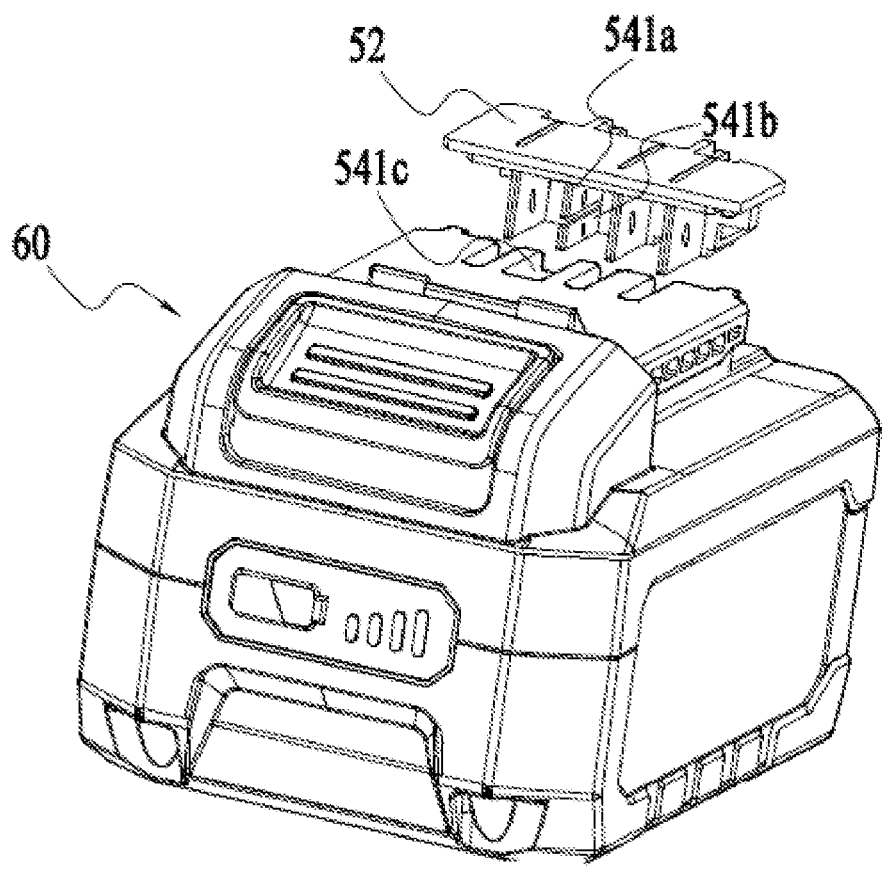
FIG. 9 is schematic diagram in which the battery pack is about to be mounted on a tool terminal base of the power tool according to the fourth example of the present disclosure.
Figure 10:
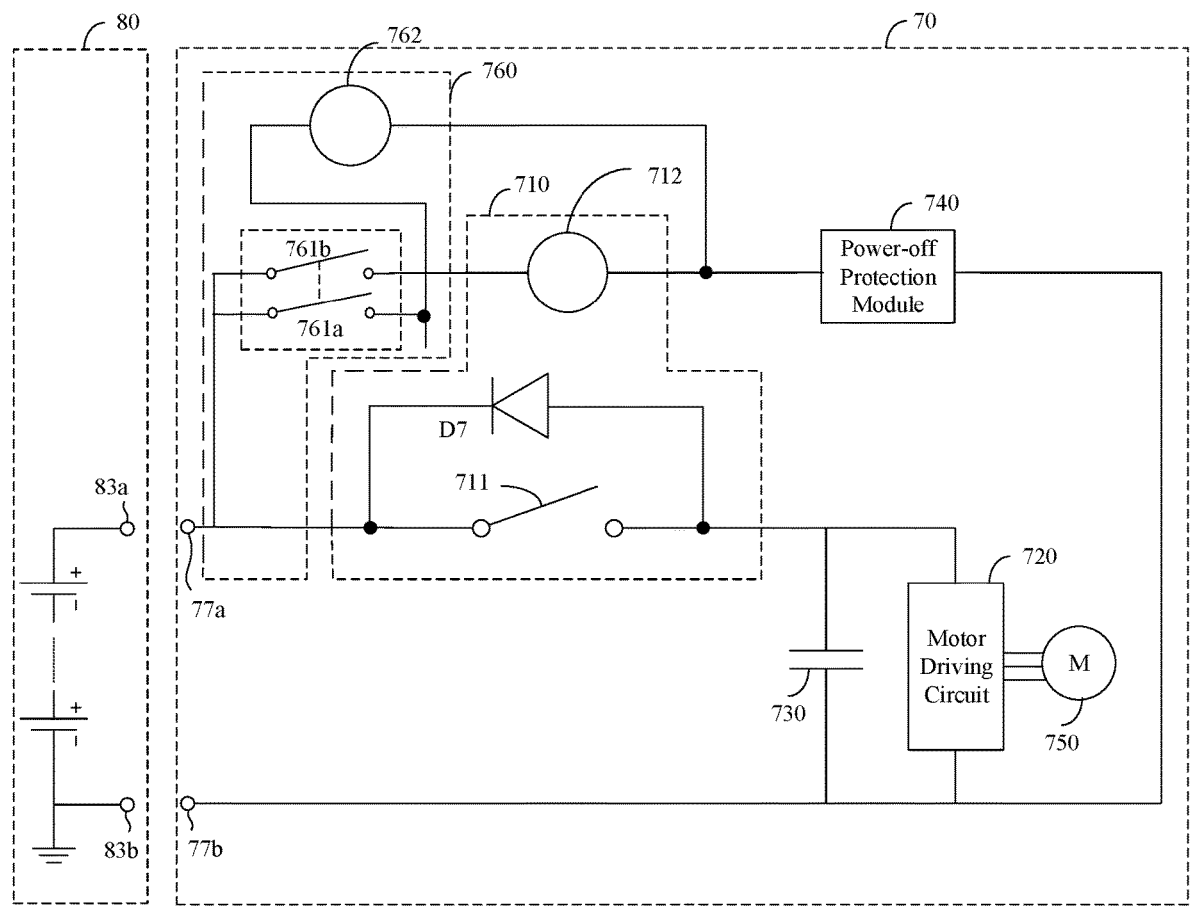
FIG. 10 is a schematic diagram of a circuit system of a power tool according to a fifth example of the present disclosure.

The positive electrode connection terminal 57a, the negative electrode connection terminal 57b, the first contact terminal 541a and the second contact terminal 541b of the power tool 50 are specifically arranged on a tool terminal base 52 of the power tool 50. The tool terminal base 52 is arranged in the battery pack joint portion 51 of the power tool 50 (FIG. 7). The battery pack joint portion 51 is configured to join the battery pack to the power tool 50.

The third contact terminal 541c is made of the conductive material. At least the contact parts between the first contact terminal 541a, the second contact terminal 541b and the third contact terminal 541c are made of a conductive material. The third contact terminal 541c is used to electrically connect the first contact terminal 541a and the second contact terminal 541b. Specifically, when the battery pack 60 is mounted to the power tool 50, the first contact terminal 541a and the second contact terminal 541b are both in a contact connection with the third contact terminal 541c. Since the contact parts between the third contact terminal 541c, the first contact terminal 541a and the second contact terminal 541b are made of a conductive material, the first contact terminal 541a and the second contact terminal 541b are electrically connected via the third contact terminal 541c.

Referring to FIG. 6 to FIG. 9, the power-off protection terminal 541 includes the first contact terminal 541a and the second contact terminal 541b which are arranged in isolation. The first contact terminal 541a is electrically connected to the coil 512. The second contact terminal 541b is electrically connected to the energy storage component 530.

Specifically, the first contact terminal 541a of the power-off protection terminal 541 is electrically connected to the second end 512b of the coil 512. The second contact terminal 541b is electrically connected to the energy storage component 530 and to the negative electrode connection terminal 57b of the power tool 50. The third contact terminal 541c is arranged on the battery pack 20. The third contact terminal 541c is specifically arranged on a connecting surface 64 of the battery pack 60. The third contact terminal 541c is arranged in parallel with the positive electrode power source terminal 63a and the negative electrode power source terminal 63b of the battery pack 60.

When the battery pack 60 is mounted to the power tool 50, the positive electrode connection terminal 57a and the negative electrode connection terminal 57b of the tool terminal base 58 are respectively connected to the positive electrode power source terminal 63a and the negative electrode power source terminal 63b of the battery pack 60. The first contact terminal 541a and the second contact terminal 541b of the power-off protection terminal 541 are connected to the third contact terminal 541c, on the battery pack 60, of the power-off protection terminal 541. The first contact terminal 541a and the second contact terminal 541b are electrically connected via the third contact terminal 541c.

In the present example, the first contact terminal 541a and the second contact terminal 541b of the power-off protection terminal 541 are insulated from each other, and arranged apart by a distance such that the first contact terminal 541a and the second contact terminal 541b are electrically disconnected from each other when the battery pack 60 is not mounted to the power tool 50. When the battery pack 60 is mounted to the power tool 60, the first contact terminal 541a and the second contact terminal 541b are both in a contact connection with the third contact terminal 541c on the battery pack 60 side. Since the contact parts between the third contact terminal 541c on the battery pack 60 side, the first contact terminal 541a and the second contact terminal 541b which are arranged on the tool side are made of a conductive material, the first contact terminal 541a and the second contact terminal 641b are electrically connected via the contact connection with the third contact terminal 541c on the battery pack 60 side.

The working principle of the power-off protection module 540 of the power tool 50 illustrated in FIG. 6 to FIG. 9 is as follows.

When the battery pack 60 is mounted to the power tool 50, the first contact terminal 541a and the second contact terminal 541b on the power tool 50 side are both connected to the third contact terminal 541c on the battery pack 60 side. Therefore, when the electromagnetic switch 510 is triggered, the first switch 511a and the second switch 511b of the switch assembly are triggered to be in the ON state. The first contact terminal 541a and the second contact terminal 541b are electrically connected to each other via the third contact terminal 541c. The conductive path of the battery pack 60 and the coil 112 is turned on. The motor driving circuitry 520 and the battery pack 60 are electrically connected, so that the motor 55 is driven to operate so that the power tool 50 would operate normally.

When the battery pack 60 is removed or dislodged, the first contact terminal 541a and the second contact terminal 541b of the power-off protection terminal 541 are not in a contact connection with the third contact terminal 541c, and so are electrically disconnected. The conductive path of the coil is cut off. The electrical connection between the coil 512 of the electromagnetic switch 510, the energy storage component 530 and the battery pack 60 is cut off. Therefore, the coil 512 of the electromagnetic switch 510 cannot obtain electric energy from the energy storage component 530. The conductive path of the coil 512 is immediately cut off and the coil 512 is immediately de-energized. The second switch 511b of the electromagnetic switch 510 is immediately opened since the coil 512 is de-energized. Therefore, when the battery pack 60 is connected to power tool 50 again, the electromagnetic switch 510 needs to be retriggered so that the first switch 511a and the second switch 511b would be connected. Then the power tool 50 is turned on, thereby realizing the purpose of power-off protection.

The power tool (10, 30, 40, 50) can well solve the problem that the power tool is immediately turned on without triggering the electromagnetic switch, in the condition that the power tool (10, 30, 40, 50) is powered-off due to dislodgement of the battery pack and then the battery pack is quickly inserted into the power tool again.

Moreover, it is considered that the existing electromagnetic switch contact has a small current-withstanding capacity. For example, the operating current, starting current and the charging current of the energy storage component of the table saw are relatively large. A long term use of the electromagnetic switch having a small current-withstanding capacity may cause ablation and sticking of the contact and failure of the switch.

Therefore, a power tool 70 according to the fifth example is further provided by the present disclosure. The power tool 70 is energized by the battery pack 80, provided with a positive electrode connection terminal 77a and a negative electrode connection terminal 77b which are respectively used to electrically connect to a positive electrode power source terminal 83a and a negative electrode power source terminal 83b of a battery pack 80.

Circuit system of the power tool 70 includes a main switch 710, a motor driving circuitry 720, an energy storage component 730, a power-off protection module 740, a motor 750, a control switch 760. The motor driving circuitry 720, the energy storage component 730 and the motor 750 are the same as or similar to that of above-mentioned examples, and so they are not to be detailed herein again.

In the present example, the main switch 710 is electrically connected to the motor driving circuitry 720, and is configured to turn on and off the electric connection between the battery pack 80 and the motor driving circuitry 720. The main switch 710 includes a first coil 712 and a first switch 711. As one specific example, the main switch 710 is a relay switch. One end of the first switch 711 of the main switch 710 is electrically connected to the positive electrode connection terminal 77a of the power tool 70, and another end of the first switch 711 is electrically connected to the motor driving circuitry 720.

The power tool 70 further includes a freewheeling diode D7. The freewheeling diode D7 is connected in parallel with the first switch 711 of the main switch 710, and is configured to allow the current to continue flowing after the first switch 711 is opened, thereby realizing the freewheeling protection.

The control switch 760 is electrically connected to the main switch 710, and is configured to control the ON and OFF of the main switch 710. Specifically, the control switch 760 is electrically connected to the first coil 712 of the main switch 710, and is configured to turn on and off the electrical connection between the first coil 712 and the battery pack 80, thereby controlling the ON and OFF of the first switch 711 of the main switch 710.

As one specific example, the control switch 760 includes a second switch 761a, a third switch 761b and a second soil 762. One end of the second switch 761a is electrically connected to the positive electrode terminal 77a of the power tool 70, and another end of the second switch 761a is electrically connected to the second coil 762. One end of the third switch 761b is electrically connected to the positive electrode connection terminal 77a of the power tool 70, and another end of the third switch 761b is connected to the first coil 712. One end of the second coil 762 is electrically connected to one end of the second switch 761a, and another end of the second coil 762 is electrically connected to the power-off protection module 740. The second switch 761a and the third switch 761 are associatively closed or opened. Optionally, the control switch 760 is an electromagnetic switch.

The power-off protection module 740 is electrically connected to the first coil 712 and the energy storage component 730, and is configured to turn on the electrical connection between the first coil 712 and the energy storage component 730 in response to the power tool 70 and the battery pack 80 being electrically disconnected, thereby avoiding the danger that the power tool 70 is immediately turned on after the battery pack 80 is inserted again in the condition that the first coil 712 of the main switch 710 makes the first switch 711 remain in the ON state due to the temporary power supply of the energy storage component 130 after the power tool 70 is temporarily de-energized.

In other example, one end of the power-off protection module 740 is electrically connected to the first coil 712 and the second coil 762 at the same time, and other end of the power-off protection module 740 is electrically connected to the energy storage component 730. The power-off protection module 740 is configured to turn on the electrical connection of the first coil 712 and the second coil 762 with the energy storage component 730 when the power tool 70 and the battery pack 80 are electrically disconnected.

In the present example, the power-off protection module 740 may adopt any one of the above-mentioned examples.

The specific working process of the power tool 70 of the present example is as follows.

When the battery pack 80 is mounted to the power tool 70, if the control switch 760 is triggered, the second switch 761a and the third switch 761b are closed. Then the second coil 762 is electrically connected to the battery pack 80. Since the third switch 761b is closed, the conductive path of the first coil 712 of the main switch 710 is closed. The second switch 711 of the main switch 710 is pushed or pulled to be in the ON state. Thus, the conductive path between the motor driving circuitry 720 and the battery pack 80 is connected, and the power tool 70 is energized and turned on.

When the battery pack 80 is electrically connected to the power tool 70, the power-off protection module 740 at least cut off the electrical connection between the first coil 712 of the main switch 710 and the energy storage component 730. The conductive path of the first coil 712 of the main switch 710 is cut off. The first switch 711 of the main switch 710 is opened. Thus, the conductive path between the motor driving circuitry 720 and the battery pack 80 is cut off. If the battery pack 80 is quickly inserted again, since the first switch 711 is opened, there is no danger that the power tool 70 restarts immediately, the control switch 762 needs to be triggered again. In other example, the power-off protection module 740 can cut off the electrical connection between the second coil 762 of the control switch 760 and the energy storage component 730.

In the present example, the current-withstanding capacity of the main switch 710 is higher than the current-withstanding capacity of the control switch 760. Specifically, the current-capacity of the first switch 711 is higher than that of the second switch 761a and the third switch 761b of the control switch 760.

The control switch 760 having a low current-withstanding capacity is arranged in the control loop, while the main switch 710 having a high current-withstanding capacity is arranged in the main loop. The main switch 710 is controlled by the control switch 760. Thus, it effectively protects the contact of the main switch 710 and extends the service life. Therefore, there is no need to redesign the electromagnetic, thereby saving costs.

The foregoing has shown and illustrated the basic principles, main features and advantages in accordance with the present disclosure. It is to be understood by those skilled in the art that the foregoing examples will not limit the present disclosure in any form. All technical solutions obtained by way of equivalent substitution or equivalent transformation shall all fall in the scope of protection of the present disclosure.

What is claimed is:

1. A power tool, powered by a battery pack, the power tool comprising:
   a housing;
   a function member configured to implement a function of the power tool;
   a motor operatively coupled to the function member configured to output a power to drive the function member;
   a motor driving circuitry electrically connected to the motor configured to drive the motor to output the power;
   an energy storage component coupled in parallel with the motor driving circuitry;
   an electromagnetic switch, comprising a coil, a first switch, and a second switch, wherein the first switch is electrically connected to the coil and configured to turn on and off an electrical connection between the coil and the battery pack and the second switch is electrically connected to the motor driving circuitry and configured to turn on and off an electrical connection between the battery pack and the motor driving circuitry; and
   a power-off protection module, electrically connected to the coil and to the energy storage component, configured to cut off an electrical connection between the coil and the energy storage component in response to the power tool and the battery pack being electrically disconnected.

2. The power tool according to claim 1, wherein the power-off protection module comprises a power-off protection terminal electrically connected to the coil and to the energy storage component.

3. The power tool according to claim 2, wherein the power-off protection terminal comprises a first contact terminal and a second contact terminal, arranged on the power tool, wherein the first contact terminal and the second contact terminal are arranged in isolation, one of the first contact terminal and the second contact terminal is electrically connected to the coil, and the other one of the first contact terminal and the second contact terminal is electrically connected to the energy storage component, and a third contact terminal, arranged on the battery pack, configured to electrically connect the first contact terminal and the second contact terminal.

4. The power tool according to claim 3, wherein the third contact terminal is made of a conductive material and the first contact terminal and the second contact terminal are at least partially made of a conductive material.

5. The power tool according to claim 4, wherein the power-off protection module comprises a trigger switch arranged on the power tool, the trigger switch is electrically connected to the coil and to the energy storage component and is operative to be triggered by the battery pack, and the trigger switch is configured to cut off the electrical connection between the coil and the energy storage component in response to the battery pack being removed from the power tool.

6. The power tool according to claim 1, wherein the power-off protection module comprises an electronic switch, electrically connected to the coil and to the energy storage component, a power-off detection circuit, configured to detect whether the battery pack and the power tool are electrically disconnected, and a controller, electrically connected to the power-off detection circuit and to the electronic switch, configured to control the electronic switch to cut off the electrical connection between the coil and the energy storage component in accordance with a signal of the power-off detection circuit.

7. A power tool, powered by a battery pack, the power tool comprising:
   a housing;
   a function member configured to implement a function of the power tool;
   a motor operatively coupled to the function member configured to output a power to drive the function member;

a motor driving circuitry electrically connected to the motor configured to drive the motor to output the power;

an energy storage component connected in parallel with the motor driving circuitry;

a main switch, comprising a first coil and a first switch, wherein the first switch is electrically connected to the motor driving circuitry and configured to turn on and off an electrical connection between the motor driving circuitry and the battery pack;

a control switch electrically connected to the first coil of the main switch configured to control an electrical connection between the first coil of the main switch and the battery pack; and a power-off protection module electrically connected to the energy storage component and to the first coil configured to cut off an electrical connection between the first coil and the energy storage component in response to the power tool and the battery pack being electrically disconnected.

8. The power tool according to claim 7, wherein the power-off protection module comprises a power-off protection terminal, the power-off protection terminal comprises a first contact terminal and a second contact terminal which are arranged on the power tool, and a third contact terminal arranged on the battery pack, the first contact terminal and the second contact terminal are arranged in isolation, one of the first contact terminal and the second contact terminal is electrically connected to the first coil and the other one of the first contact terminal and the second contact terminal is electrically connected to the energy storage component, and the third contact terminal is configured to electrically connect the first contact terminal and the second contact terminal.

9. The power tool according to claim 7, wherein the power-off protection module comprises a trigger switch arranged on the power tool, one end of the trigger switch is electrically connected to the first coil and another end of the trigger switch is electrically connected to the energy storage component, and the trigger switch is configured to cut off the electrical connection between the first coil and the energy storage component in response to the battery pack being removed from the power tool.

10. The power tool according to claim 7, wherein the power-off protection module comprises an electronic switch, electrically connected to the first coil and to the energy storage component, a power-off detection circuit configured to detect whether the battery pack and the power tool are electrically disconnected, and a controller, electrically connected to the power-off detection circuit and to the electronic switch configured to control the electronic switch to cut off the electrical connection between the first coil and the energy storage component in accordance with a signal of the power-off detection circuit.

11. The power tool according to claim 7, wherein the control switch comprises a second coil, a second switch electrically connected to the second coil configured to turn on and off an electrical connection between the second coil and the battery pack, and a third switch, electrically connected to the first coil of the main switch configured to turn on and off the electrical connection between the first coil and the battery pack.

12. The power tool according to claim 11, wherein the first coil and the second coil are both electrically connected to the power-off protection module.

13. The power tool according to claim 7, wherein a current-withstanding capacity of the control switch is lower than a current-withstanding capacity of the electromagnetic switch.

14. The power tool according to claim 7, wherein the main switch is a relay switch and the control switch is an electromagnetic switch.

15. A power tool, comprising:
a housing;
a function member configured to implement a function of the power tool;
a battery pack detachably mounted to the power tool configured to provide an electric power for the power tool;
a motor operatively coupled to the function member configured to output a power to drive the function member;
a motor driving circuitry electrically connected to the motor configured to drive the motor to output the power;
an energy storage component connected in parallel with the motor driving circuitry;
an electromagnetic switch, comprising a coil, a first switch, and a second switch, wherein the first switch is electrically connected to the coil and configured to turn on and off an electrical connection between the coil and the battery pack, the second switch is electrically connected to the motor driving circuitry and configured to turn on and off an electrical connection between the battery pack and the motor driving circuitry; and
a power-off protection module electrically connected to the coil and to the energy storage component configured to cut off an electrical connection between the coil and the energy storage component in response to the power tool and the battery pack being electrically disconnected.

16. The power tool according to claim 15, wherein the power-off protection module comprises a power-off protection terminal electrically connected to the coil and to the energy storage component,
the power-off protection terminal comprises a first contact terminal and a second contact terminal which are arranged on the power tool, and a third contact terminal arranged on the battery pack, the first contact terminal and the second contact terminal are arranged in isolation, one of the first contact terminal and the second contact terminal is electrically connected to the first coil and the other one of the first contact terminal and the second contact terminal is electrically connected to the energy storage component, and the third contact terminal is configured to electrically connect the first contact terminal and the second contact terminal.

17. The power tool according to claim 15, wherein the power-off protection module comprises a trigger switch arranged on the power tool, the trigger switch is electrically connected to the coil and to the energy storage component and is operative to be triggered by the battery pack, and the trigger switch is configured to cut off the electrical connection between the coil and the energy storage component in response to the battery pack being removed from the power tool.

* * * * *